(12) United States Patent
Stavenuiter et al.

(10) Patent No.: US 11,525,229 B2
(45) Date of Patent: Dec. 13, 2022

(54) CRANE VESSEL

(71) Applicant: TETRAHEDRON B.V., Rotterdam (NL)

(72) Inventors: Wilco Stavenuiter, Rotterdam (NL); Alexander Ronse, Rotterdam (NL)

(73) Assignee: TETRAHEDRON B.V., Rotterdam (NL)

( * ) Notice: Subject to any disclaimer, the term of this patent is extended or adjusted under 35 U.S.C. 154(b) by 0 days.

(21) Appl. No.: 17/276,655

(22) PCT Filed: Sep. 16, 2019

(86) PCT No.: PCT/NL2019/050604
§ 371 (c)(1),
(2) Date: Mar. 16, 2021

(87) PCT Pub. No.: WO2020/060394
PCT Pub. Date: Mar. 26, 2020

(65) Prior Publication Data
US 2022/0042266 A1       Feb. 10, 2022

(30) Foreign Application Priority Data
Sep. 17, 2018   (NL) ..................................... 2021651

(51) Int. Cl.
*E02B 17/02* (2006.01)
*B66C 23/18* (2006.01)
(Continued)

(52) U.S. Cl.
CPC .......... *E02B 17/021* (2013.01); *B66C 23/185* (2013.01); *E02B 17/08* (2013.01); *E02B 2017/0056* (2013.01)

(58) Field of Classification Search
CPC .................. E02B 17/021; E02B 17/08; E02B 2017/0056; B66C 23/185; B66C 23/52
See application file for complete search history.

(56) References Cited

U.S. PATENT DOCUMENTS 3,557,968 A * 1/1971 Thaeter ................. B66C 23/525
                                                          212/311
4,653,656 A   3/1987 Triplett
(Continued)

FOREIGN PATENT DOCUMENTS

SU        650962 A1    3/1979
WO    2008100137 A2    8/2008
WO    2014025253 A1    2/2014

OTHER PUBLICATIONS

Search Report and Written Opinion from corresponding Netherlands Application No. NL2021651, dated May 20, 2019.
(Continued)

*Primary Examiner* — Carib A Oquendo
(74) *Attorney, Agent, or Firm* — Workman Nydegger

(57) ABSTRACT

A jack-up crane vessel or semi-submersible crane vessel is provided including a hull with a deck, and a crane on the hull for hoisting a load outside the deck. The crane includes a slewing crane base with a first suspension, an elongated boom that is rotatable around a horizontal rotation axis with respect to the first suspension, at least two pendants between the boom and the first suspension that mutually converge toward the distal boom section, a boom spacer between the boom and the first suspension, and a boom luffing installation for driving the rotation of the boom around the horizontal rotation axis between a lowered transport position and a raised operational position. In the direction of the vertical rotation axis the first suspension extends at least in the lowered transport position of the boom above the boom heel of the boom.

20 Claims, 9 Drawing Sheets

(51) Int. Cl.
   *E02B 17/08* (2006.01)
   *E02B 17/00* (2006.01)

(56) References Cited

U.S. PATENT DOCUMENTS

| | | | | |
|---|---|---|---|---|
| 6,826,452 | B1* | 11/2004 | Holland | B66C 23/00 |
| | | | | 318/568.22 |
| 2015/0368075 | A1* | 12/2015 | Clymans | B66C 23/52 |
| | | | | 212/273 |
| 2016/0368743 | A1* | 12/2016 | De Groot | F16C 19/30 |
| 2019/0248631 | A1* | 8/2019 | Roodenburg | B66C 23/185 |
| 2019/0337772 | A1* | 11/2019 | Roodenburg | B66D 1/50 |
| 2020/0158176 | A1* | 5/2020 | Van Der Hoek | B63B 27/10 |
| 2020/0299108 | A1* | 9/2020 | Van Veluw | B66C 13/08 |
| 2021/0032079 | A1* | 2/2021 | Vehmeijer | B66C 13/02 |

OTHER PUBLICATIONS

International Search Report and Written Opinion from PCT Application No. PCT/NL2019/050604, dated Jan. 27, 2020.

* cited by examiner

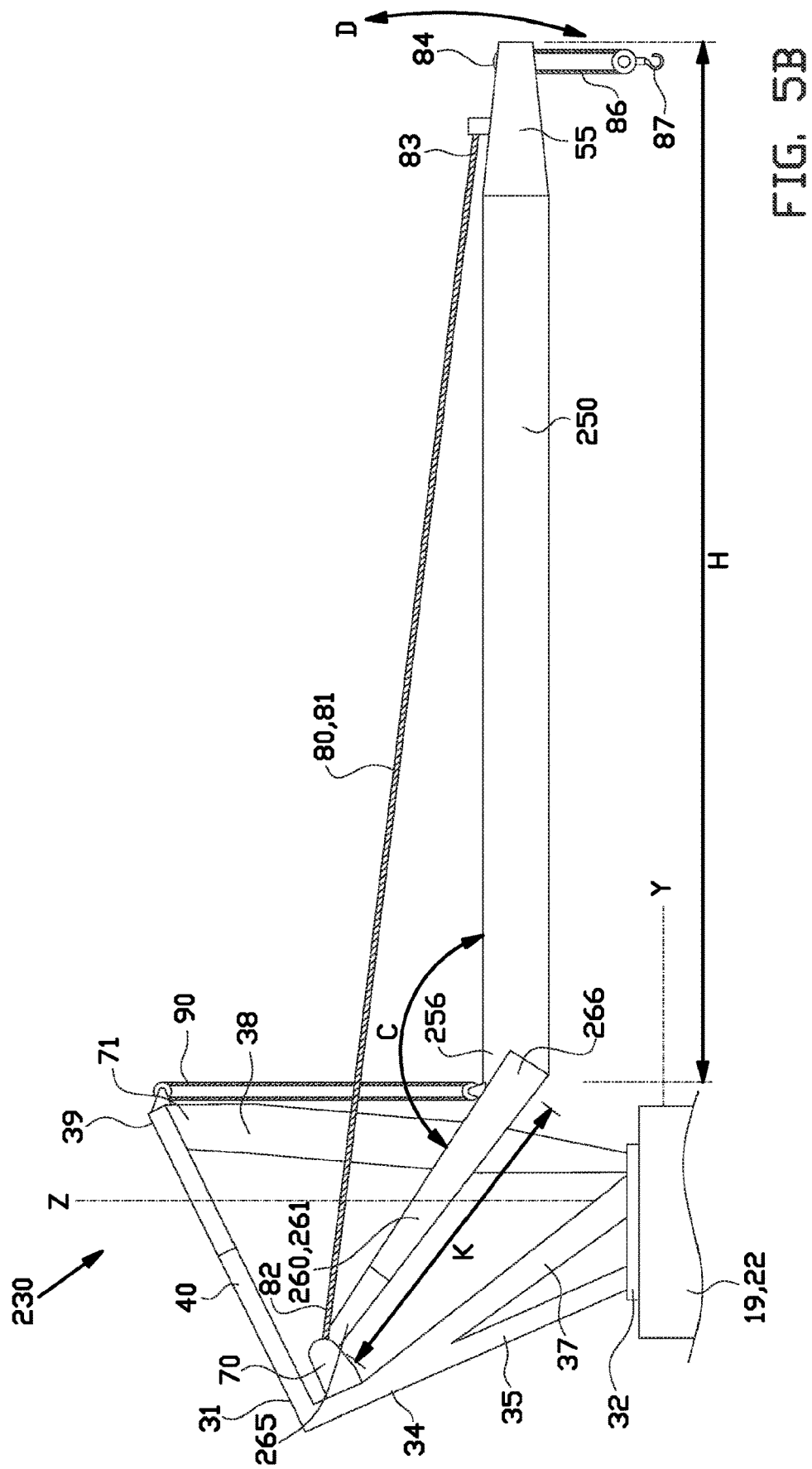

CRANE VESSEL

BACKGROUND

The invention relates to a jack-up crane vessel or semi-submersible crane vessel comprising a hull with a deck and a crane on the hull for hoisting a load outside the deck.

Crane vessels of this kind are used for building offshore wind turbines, wherein turbine components, such as a tower, a nacelle with a hub, and the blades are hoisted high above the waterline. The known crane vessels have a crane that comprises a slewing crane base and a very long boom that is rotatable connected with the crane base at the boom heel. This very long boom is raised and lowered by means of a luffing hoist tackle above the boom that is hauled in or paid out by a winch.

Known large offshore wind turbines typically have power of 8 Megawatt and require a lifting height for its components above the waterline of 140 meters. This lifting height is reached with the known cranes by using the very long boom that projects from the hull in the lowered transport position. Offshore wind turbines are continuously scaled up, wherein a power of 12 Megawatt is envisaged in the near future, and thereby significant higher lifting heights for the turbine components.

SUMMARY OF THE INVENTION

Using longer booms of the known crane for reaching higher lifting heights has disadvantages. A longer boom projects for example further from the hull what requires a heavy boomrest and cause sailing limitations. The cables in the luffing tackle are continuously wounded around between the slewing crane base and the tip of the boom and extend parallel to each other, so that in case of a lateral deflection of the boom tip, no resistance or sideward counter force against that is created in the luffing tackle. So when the boom tip is loaded by a side force due to a slight swing of the load or any other effect then the boom has to carry these loads. For such crane the global buckling or Euler column buckling effective length factor is high, whereby especially for a very long boom these effects require a lot of heavy weight for strengthening the boom, reducing the efficiency of these booms.

It is an object of the present invention to provide a crane vessel of the kind as described, having a crane that can meet future lifting heights without causing significant limitations as described before.

The invention provides a jack-up crane vessel or semi-submersible crane vessel comprising a hull with a deck, and a crane on the hull for hoisting a load outside the deck, wherein the crane comprises a slewing crane base that is rotatable with respect to the hull around a vertical rotation axis, an elongated boom that is rotatable around a horizontal rotation axis with respect to the crane base, at least two pendants between the boom and the crane base, a boom spacer between the boom and the crane base, and a boom luffing installation for driving the rotation of the boom around the horizontal rotation axis between a lowered transport position and a raised operational position, wherein the crane base comprises a slew platform and a base frame above the slew platform that forms a first suspension of the crane base for the boom, wherein the boom comprises a distal boom section with a boom tip and a proximal boom section with a boom heel, wherein the pendants have a first end that is connected with the first suspension and an opposite second end that is connected with the distal boom section, wherein the pendants mutually converge toward the distal boom section, wherein the boom spacer has a first end that is rotatable connected with the first suspension for rotation around the horizontal rotation axis, and an opposite second end that is spaced apart from the first end and that is connected with the boom heel to keep the boom spaced apart from the horizontal rotation axis, and wherein in the direction of the vertical rotation axis the first suspension extends at least in the lowered transport position of the boom above the boom heel of the boom.

The vessel according to the invention has a crane that comprises a slewing crane base with a first suspension, and a boom that is rotatable connected with the crane base via a boom spacer between the first suspension and the boom heel. The boom spacer guides the lift of the entire boom in the vertical direction when it is luffed to its operational position, which contributes to the effective height of the boom tip. The pendants converge from the first suspension toward the boom tip to form a triangle configuration in which the pendants are loaded under pure pulling forces. Any side forces created by a slight swinging of the load or any other effect in a sideward direction are taken by de pendants and transferred to the first suspension. This prevents the boom from bending, which improves the efficiency of the boom. The boom and the boom spacer form together with that triangle configuration a form stable tetrahedron configuration.

In an embodiment the boom spacer keeps the boom heel spaced apart from the horizontal rotation axis over a fixed distance to ensure the same tetrahedron configuration in both the lowered position and the raised position of the boom.

In an embodiment the first suspension extends in the raised position of the boom in the direction of the vertical rotation axis at about the same height as the boom heel of the boom.

In an embodiment extends in the raised position of the boom, the boom heel with respect to the first suspension at the opposite side of the vertical rotation axis.

In an embodiment the horizontal rotation axis extends in a projection parallel to the horizontal rotation axis in a direction transverse to the elongated direction of the boom aside the boom, whereby the horizontal rotation axis is located far outside the central axis or the outer side of the boom.

Quantitatively expressed the boom spacer may have a length between the horizontal rotation axis and the boom heel that is 20-50% of the length of the boom between the boom tip and the boom heel.

In an embodiment the boom spacer is connected under an angle with the proximal boom section to provide the distance with the horizontal rotation axis in an efficient manner.

In an embodiment thereof the angle is a fixed angle.

In an embodiment the angle is 90-145 degrees.

In an embodiment the pendants have the same fixed length between the first end and the second end in the lowered transport position and in the raised operational position of the boom. Herein it is to be understood that the pendants may be stretched elastically under the applied pulling forces, but tackles and sheaves are not necessary. In this manner the pendants can be loaded without being subjected to curvatures around sheaves, that form potential wear spots or even break spots.

In an embodiment the pendants comprise a cable or rope between the first end and the second end.

In an embodiment thereof the rope or cable is based on a synthetic fiber, which can handle high pulling forces with respect to their specific weight, provided that they are not guided or curved around sheaves for example.

In an embodiment the first ends of the pendants are rotatable connected with the first suspension to ensure that they are loaded under pure pulling forces only.

The mutual converging of the pendants towards the distal boom section can be ensured when the first ends of the pendants are connected with the first suspension at a mutual distance in the direction of the horizontal rotation axis that is larger than the largest width of the distal boom section in that direction.

The mutual converging of the pendants towards the distal boom section can alternatively be ensured when the first ends of the pendants are connected with the first suspension at a mutual distance in the direction of the horizontal rotation axis that is larger than the largest width of the boom in that direction.

The mutual converging of the pendants towards the distal boom section can alternatively be ensured when the first ends of the pendants are connected with the first suspension at a mutual distance in the direction of the horizontal rotation axis that is larger than the largest width of the slew platform in that direction.

In an embodiment the boom spacer comprises two spacers that extend spaced apart from each other to define a passage in between, wherein the vertical rotation axis extends through the passage. This passage can be used to accommodate a leg of a jack-up vessel, whereby the crane can be built on top of a jacking house for that leg without being hampered by that leg in the luffing of the boom.

In an embodiment the boom luffing installation comprises a linear drive between the crane base and the boom heel.

In an embodiment the crane base comprises a second suspension at the opposite side of the first suspension with respect to the vertical rotation axis, wherein the boom luffing installation comprises a hoisting assembly between the second suspension and the boom heel.

In an embodiment the base frame comprises two upward box girders having a bottom end that is mounted to the slew platform spaced apart from each other, and two cross box girders having a bottom end that is mounted to the slew platform spaced apart from each other, wherein the upward box girders and the cross box girders are connected with each other at their opposite upper end in pairs to form two triangular frame configurations or A-frame configurations on opposite sides of the vertical rotation axis, wherein the first suspension is located at the top of the triangular frame configurations or A-frame configurations.

In an embodiment the crane comprises hoisting sheaves at the boom tip, a multi sheave hoisting block and a load hoisting tackle with multiple cable windings between the sheaves for hoisting a load.

In an embodiment the distal boom section is a latticed distal boom section. The lattice construction can be made from steel tubes or from relatively lightweight carbon fiber tubes.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of exemplary embodiments shown in the attached drawings, in which:

FIGS. 5A and 5B are an isometric view and a side view of a crane according to a second embodiment, in its lowered transport position.

DETAILED DESCRIPTION OF THE INVENTION

Figure 1:
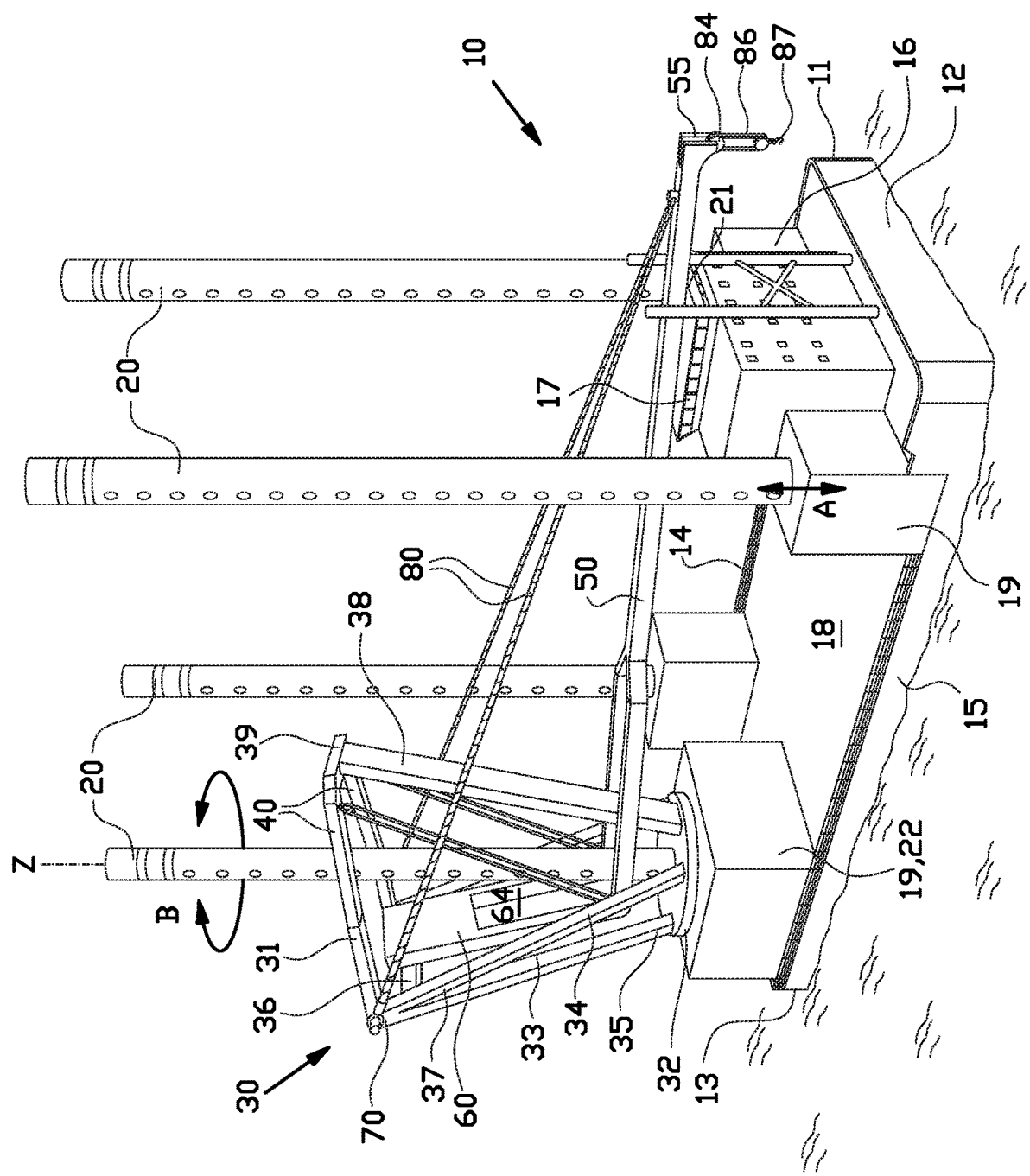
FIG. 1 is an isometric view of a crane vessel having a crane according to a first embodiment of the invention during sailing to an offshore installation site, with the crane in its lowered transport position.

FIG. 1 shows a self-elevating jack-up crane vessel 10 during sailing at sea 1. In this embodiment the crane vessel 10 is self-propelled, but alternatively the crane vessel 10 is towed by tugs. The crane vessel 10 comprises in this embodiment a rectangular hull 11 having a bow 12, a stern 13 a port side 14, a starboard side 15 and a large deck 18. The crane vessel 10 comprises a steering house 16, and in this example four upright legs 20 that are guided through jacking houses 19 having an internal drive to lower and raise each of the legs 20 in direction A as known per se to raise the hull 11 above the sea 1. During sailing all legs 20 are raised and extend with their top side high above the deck 18 and the bridge 17.

The crane vessel 10 comprises a crane 30 according to a first embodiment of the invention above a crane foundation 22 on the hull 11. In this example the crane foundation 22 coincides with one of the jacking houses 19, in this example above the rear starboard side jacking house 19. The crane vessel 10 with the crane 30 is designed to handle large wind turbine components, such as a tower 5, a nacelle 6 with a hub 7, and blades 8 to build an offshore wind turbine 4 at an offshore installation site. The wind turbine components may be shipped on the deck 18 to the installation site, but alternatively a feeder barge is used to ship the wind turbine components to the crane vessel 10.

On the installation site the crane vessel 10 is jacked up by lowering the legs 20 in direction A. The wind turbine components are installed aside the deck 18 by means of the crane 30. The offshore wind turbine 4 typically has a power of 8 Megawatt and require a lifting height above the waterline of 140 meters. Offshore wind turbines are continuously scaled up, wherein a power of 12 Megawatt is envisaged in the near future, and thereby a higher lifting height for the turbine components. The crane vessel 10 with the crane 30 can meet this increasing future demand.

The invention is not limited to a jack-up crane vessel as shown in the figures. A jack-up rig with the crane 30 is considered a crane vessel according to the invention. The crane 30 may alternatively be installed on a semi-submersible crane vessel for performing the same kind of offshore hoisting operations as described above.

The crane 30 is shown in more detail in FIG. 3 and FIGS. 4A-4C. The crane 30 comprises a steel slewing crane base 31 around the leg 20 that is rotatingly mounted to the crane foundation 22 for rotation of the entire crane 30 in direction B around its vertical rotation axis Z, which in this example corresponds with the central axis of the leg 20 that extends through the jacking house 19. In FIG. 3 and FIGS. 4A-4C the leg 20 is removed for illustrative purposes only.

The crane base 31 comprises a slew platform 32 and a rigid base frame 33 on the slew platform 32. The base frame 33 comprises a back structure having two upward back box girders 35 that are at their bottom end mounted to the back side of the slew platform 32 and that diverge upwardly away from each other and away from the vertical rotation axis Z. The upward back box girders 35 are at their top end connected with a transverse back box girder 36. The base frame 33 furthermore comprises two cross box girders 37 that are at their bottom end mounted to the front side of the slew platform 32 when considered in the direction of a horizontal axis Y and that diverge upwardly away from each other and away from the vertical axis Z and toward the upward back box girders 35. The cross box girders 37 and the transverse back box girder 36 together form a portal 34 of the base frame 33. The cross box girders 37 are at their top end connected with the respective upward back box girder 35, close to the transverse back box girder 36 to form rigid triangular frame configurations or A-frame configurations on both sides of the vertical axis Z. The portal 34 forms a back suspension or first suspension 70 of the crane base 31 at the upper back of the base frame 33, near the transverse back box girder 36.

The crane base 31 comprises an upward front box girder 38 that is at its bottom end mounted to the front side of the slew platform 32. The upward front box girder 38 supports at its top end a transverse front box girder 39 that at its ends merges into two angled side box girders 40. The side box girders 40 are at their opposite end connected with the meeting ends of the upward back box girders 35 and the cross box girders 37 to form a rigid front suspension or second suspension 71 of the crane base 31 at the transverse front box girder 39.

The crane 30 comprises a boom 50 that extends in a projection parallel to the vertical axis Z in the direction of the horizontal axis Y. The boom 50 comprises in this example a single, straight elongated distal boom section 51 with a boom tip 55. In this example the distal boom section 51 is a latticed distal boom section 51. The lattice construction can be made from carbon fiber tubes, or from steel tubes. In this example, the distal boom section 51 merges via a boom splitter 52 into two straight, elongated proximal boom sections 53 that form a boom heel 56 at the bottom. In this example the proximal boom sections 53 are box girder proximal boom sections 53. The proximal boom sections 53 have an elongated first free space 54 in between for passage of the upward front box girder 38 and encircling the leg 20 that extends vertically through the crane base 31. In this example the boom splitter 52 is positioned to come between the two legs 20 at the starboard side of the crane vessel 10 when the boom 50 is in its lowered transport position. It is also possible to position the boom splitter 52 beyond both these legs 20 whereby both these legs 20 extends through the first free space 54. When the crane 30 is non-leg encircling, the proximal boom section can be a single proximal boom section with the boom heel. In that case the front upward box girder 38 can comprise two sections aside each other with the boom in between.

The crane 30 comprises a steel boom spacer 60 that extends between the boom heel 56 and the crane base 31. The boom spacer 60 comprises two straight, elongated spacers 61 that extend spaced apart from each other between the respective proximal boom sections 53 and the first suspension 70. The spacers 61 are latticed spacers or box girder spacers. The spacers 61 each have a first end 65 that is connected with a transverse top box girder 62 that is rotatable connected with the first suspension 70 for rotation in direction D around a horizontal rotation axis X. Thereby the boom spacer 60 has two rotation points with the first suspension 70, that are spaced apart from each other in the direction of the horizontal rotation axis X. The spacers 61 each have an opposite second end 66 that merge under an angle C into the bottom ends of the proximal boom sections 52. In this example these are rigidly connected with each other, under a fixed angle C of about 90-130 degrees. The proximal boom sections 52 and the spacers 61 may alternatively be connected with each other by means of hinges with a horizontal rotation axis that extends parallel to the rotation axis X at the first suspension 70. The spacers 61 have an elongated second free space 64 in between that forms a continuation of the first free space 54 for passage of the front upward box girder 38 and the leg 20 that extends vertically through the crane base 31.

The crane 30 comprises two elongated pendants 80 that extend between the first suspension 70 and the boom tip 55. The pendants 80 mutually converge toward the distal boom section 51 to form a substantial triangular configuration. The pendants 80 each comprise a cable or rope 81 that is in this example based on a synthetic fiber, for example an aramid or a high performance polyethylene (HPPE) (for example known under the name Dyneema®), or carbon. The pendants 80 comprise a first end 82 on the rope 81 that is rotatable connected with the first suspension 70 to rotate around a horizontal rotation axis that is parallel to, or coincides with the horizontal rotation axis X of the boom spacer 60. The two first ends 82 are spaced apart from each other at the first suspension 70 over a distance G that is larger than the largest width of the distal boom section 51, and preferably larger than the largest width of the entire boom 50. The distance G is also larger than the largest width of the slew platform 32 in that direction. The first ends 82 of the ropes 81 are in the proximity of their respective nearest rotation point of the spacers 61 to prevent the generation of bending moments in the transverse back box girder 37.

The pendants 80 comprise a second end 83 on the rope 81 that is connected with the boom tip 55. The ropes 81 have a fixed material length between the first end 82 and second end 83 of the pendants 80. The ropes 81 may under this fixed material length stretch elastically due to a pulling force action on it. The pendants 80 mutually converge toward the boom tip 55 forming a triangular configuration. Alternatively the pendants 80 mutually converge toward the boom tip 55 while crossing each other before the boom tip 55, giving effectively the same triangular configuration. In the operative position the boom 50 is loaded under a pressure force in its elongated direction while the pendants 80 are loaded under pure pulling forces, such that any side forces created by a load motion in sideward direction E, for example by a slightly swinging hoisted load or by any other external factor, are taken by the pendants 80 and transferred to the first suspension 70 where the first ends are spaced apart from each other over the distance G, which is forms the base of the triangle configuration of the pendants 80. This base is located high in the base frame 33 of the crane base 31. The pendants 80 give the boom tip 55 sideward stability against lateral bending of the boom 50 to prevent lateral buckling of the boom 50.

The boom 50, the boom spacer 60, the first suspension 70 and the pendants 80 converging toward the boom tip 55 together form a form stable tetrahedron configuration having a free space 85 between the notional ribs of the tetrahedron.

In this example the pendants 80 have their second ends 83 close to each other on the boom tip 55.

The crane 30 comprises multiple hoisting sheaves 84 at the boom tip 55, a multi sheave hoisting block 87 and a load hoisting cable 86 with multiple windings there between for hoisting the load. The boom 50 has a length H between the boom tip 55 and the boom heel 56, and the boom spacer 60 has a length K between the boom heel 56 and the rotation axis X. The length K of the boom spacer 61 is 20-50% of the Length H of the boom 50.

Figure 2:
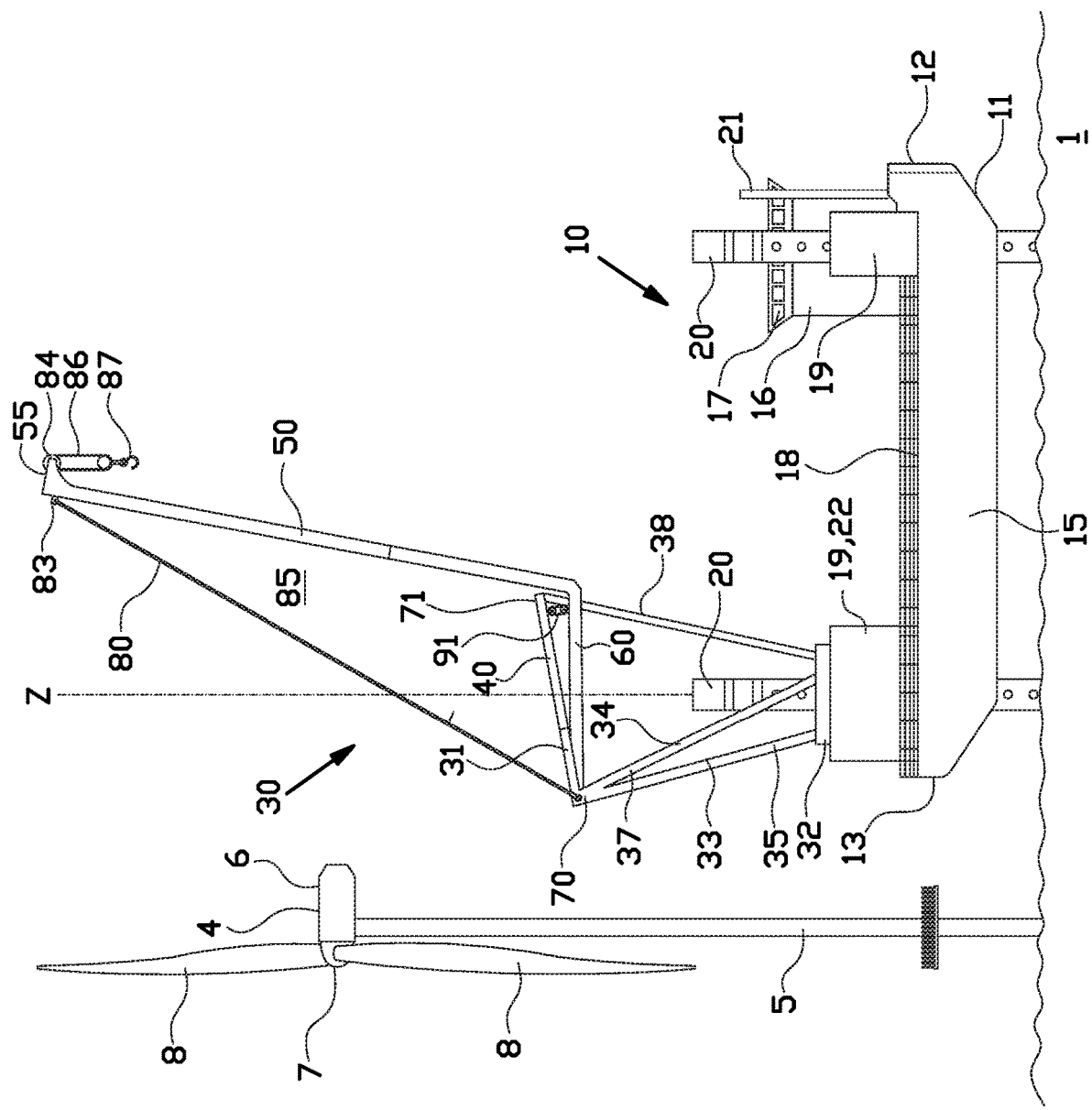
FIG. 2 is a side view of the crane vessel according to FIG. 1, jacked-up and with the crane in its operational raised position.
Figure 3:
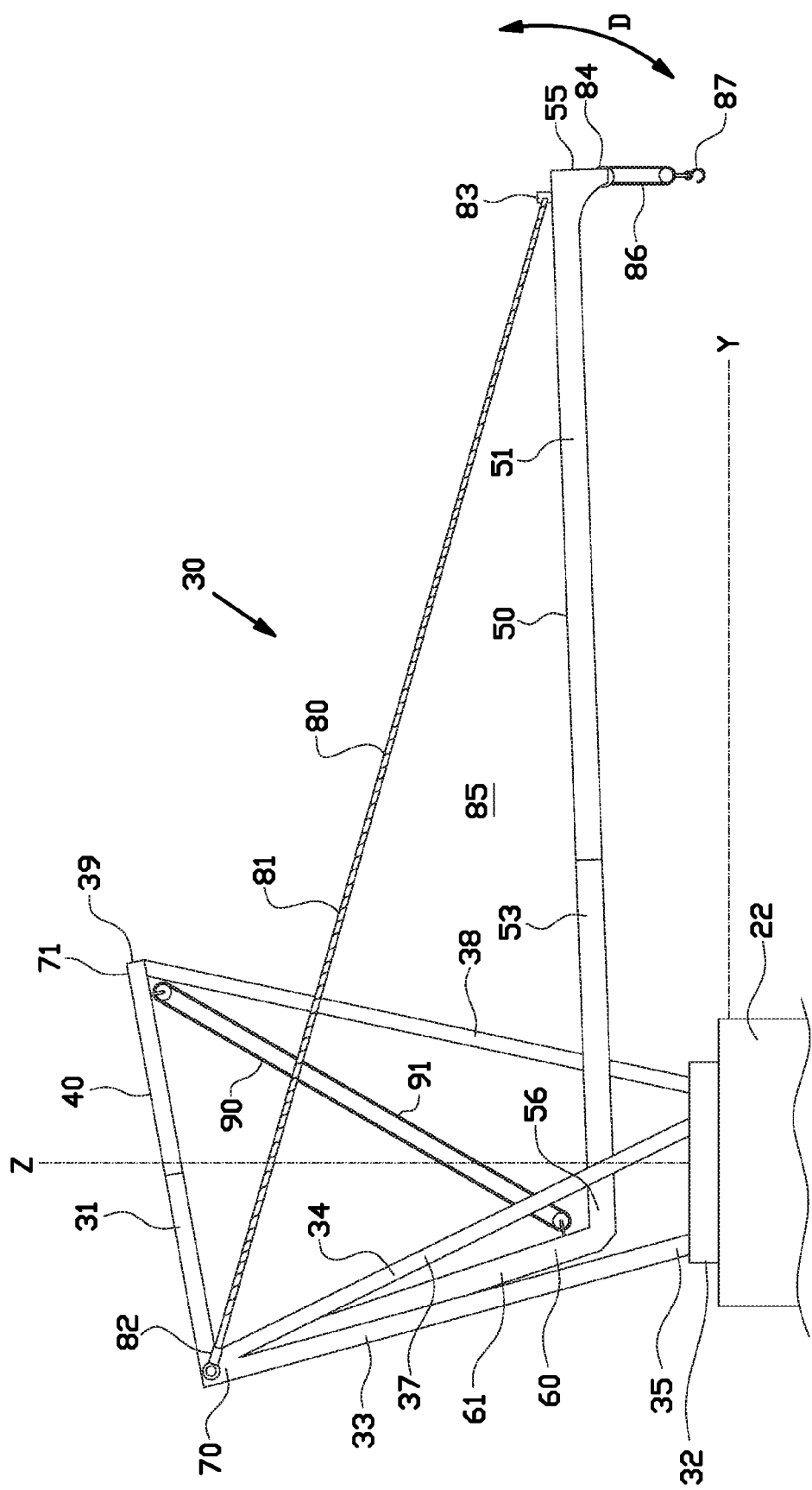
FIG. 3 a side view of the crane in more detail, in its lowered position as shown in FIG. 1.

The crane 30 comprises a boom luffing installation 90 between the boom spacer 60 and the front suspension 71. The boom luffing installation 90 comprises a hoisting assembly 91 between the front suspension 71 and the boom heel 56. The boom 50 can by means of the boom luffing installation 90 be lifted and rotated around the horizontal rotation axis X between its lowered position as shown in FIG. 1, wherein in this example it is supported by a boomrest 21 in front of the steering house 16, and its operational raised position for hoisting as shown in FIG. 2. When the boom 50 is luffed into the operational position, the entire boom 50, that is including the boom heel 56, is lifted vertically upwards by the boom spacer 60 while the tetrahedron configuration remains stable.

Figure 4A:
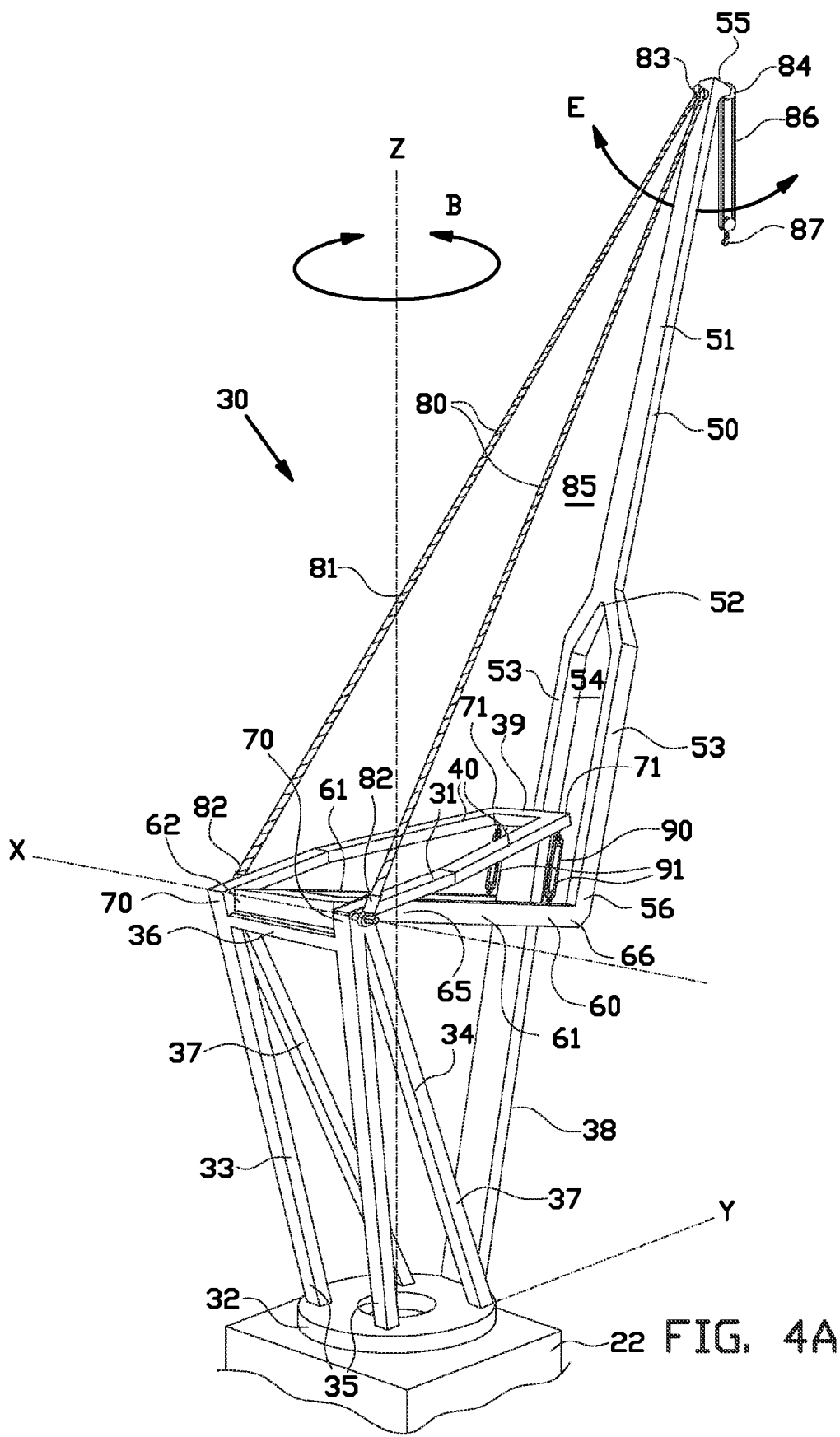
FIGS. 4A-4C are an isometric view, a side view and a back view of the crane in its raised position as shown in FIG. 2.
Figure 4B:
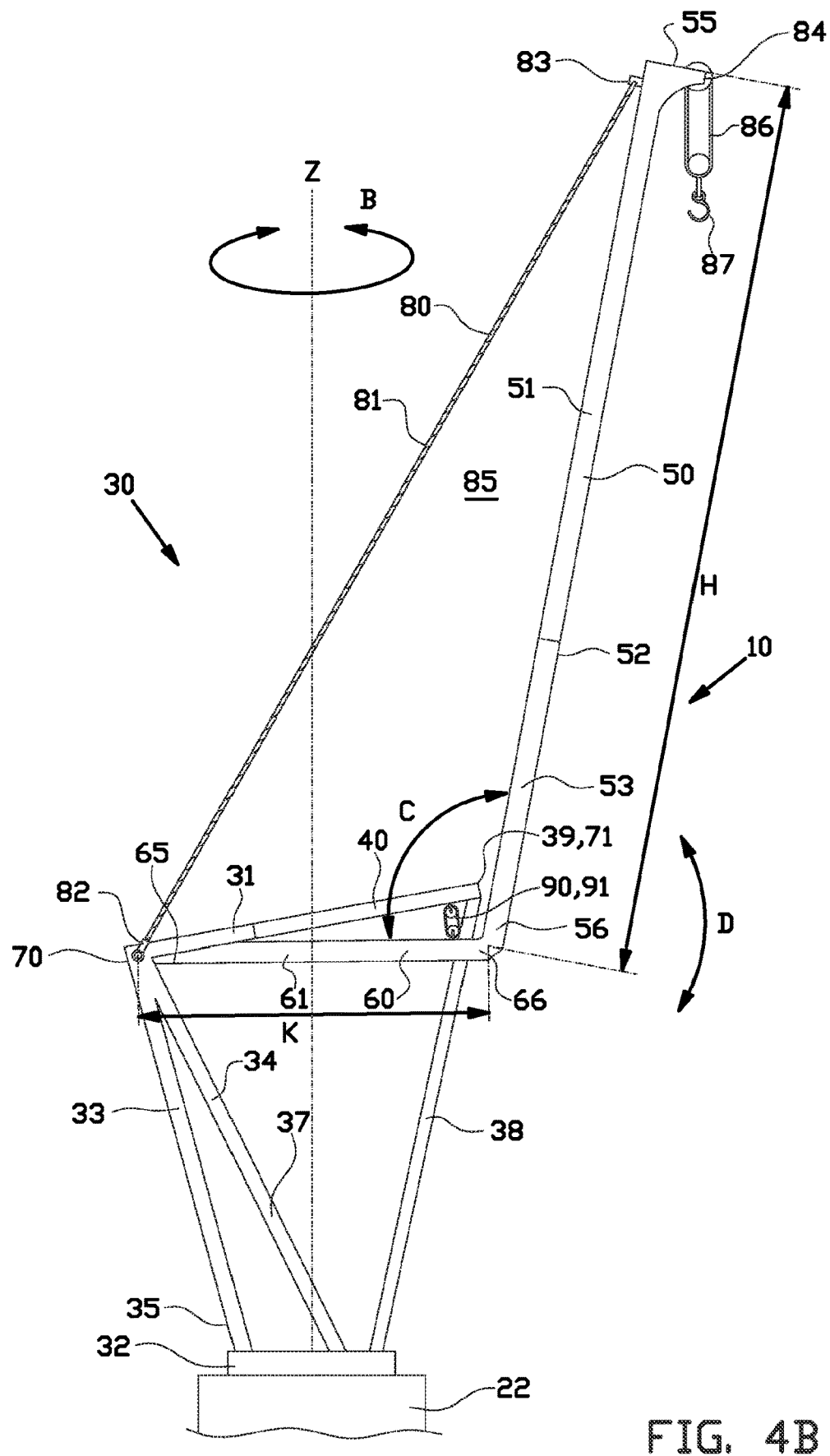
Figure 4C:
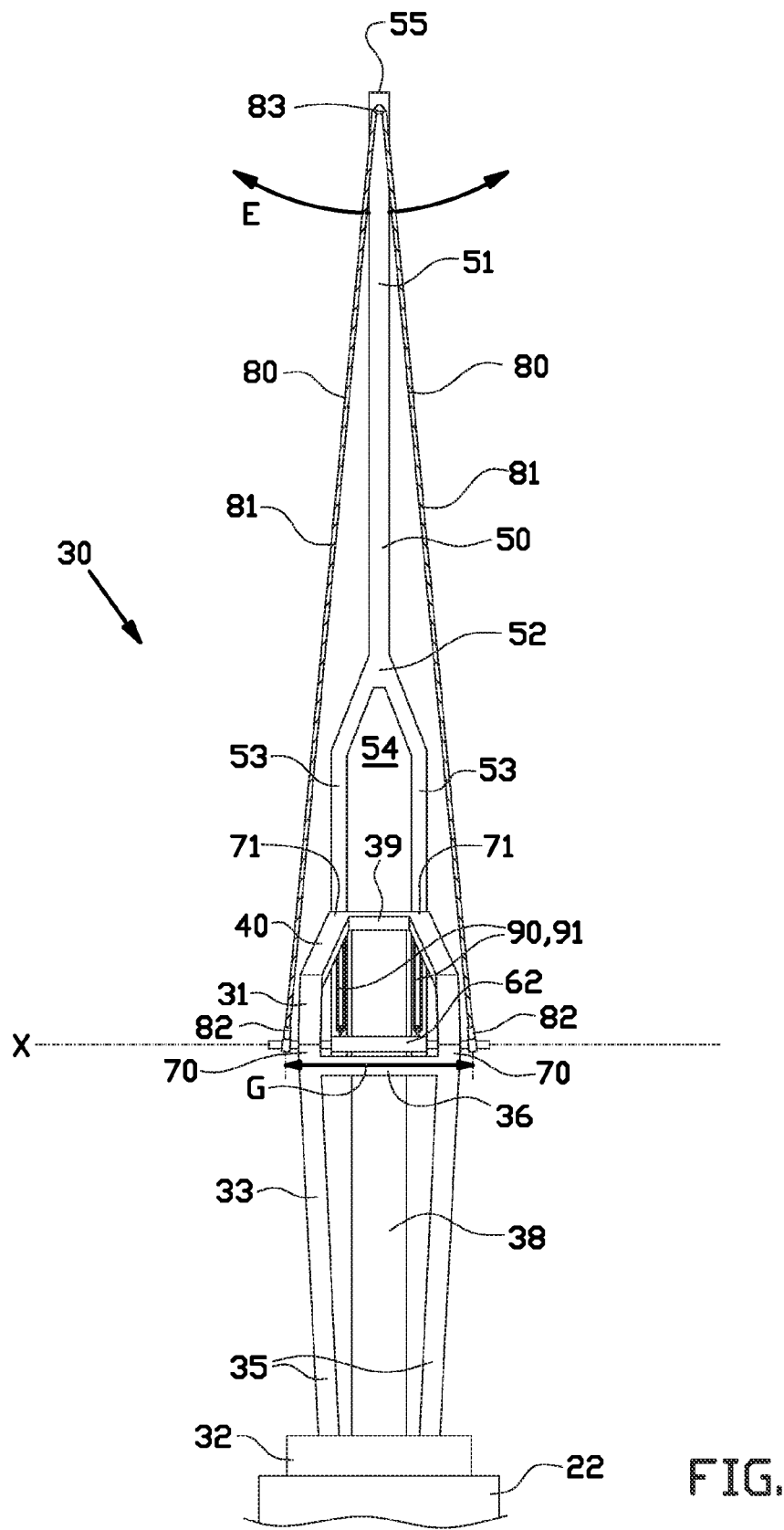

By lifting the entire boom 50 with respect to the first suspension 70 in a vertical direction, having the horizontal rotation axis X in vertical direction higher located than the crane base 31 and spaced apart from the boom 50, the maximum lifting height of the crane 30 is extended when compared to a traditional boom that is at the boom heel directly rotatable connected with a crane base and raised by means of a luffing hoist tackle above the boom. In the operational position as shown in FIG. 4B, the first suspension 70, in particular the horizontal rotation axis X of the boom 50, extends at about the same vertical height as the boom heel 56. That is, within 5 meters vertical height difference in the direction of the vertical rotation axis Z.

Figure 5A:
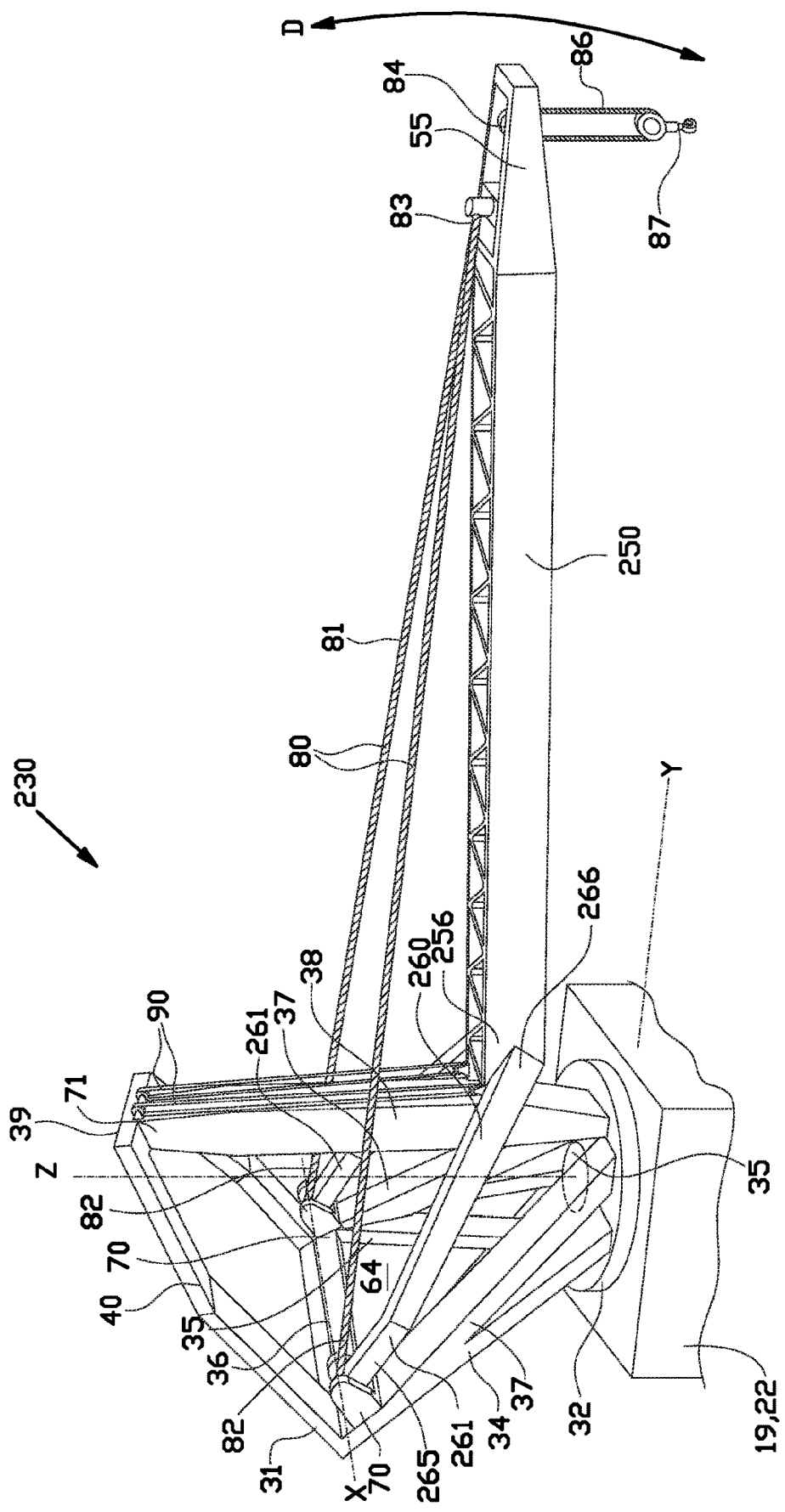
Figure 6:
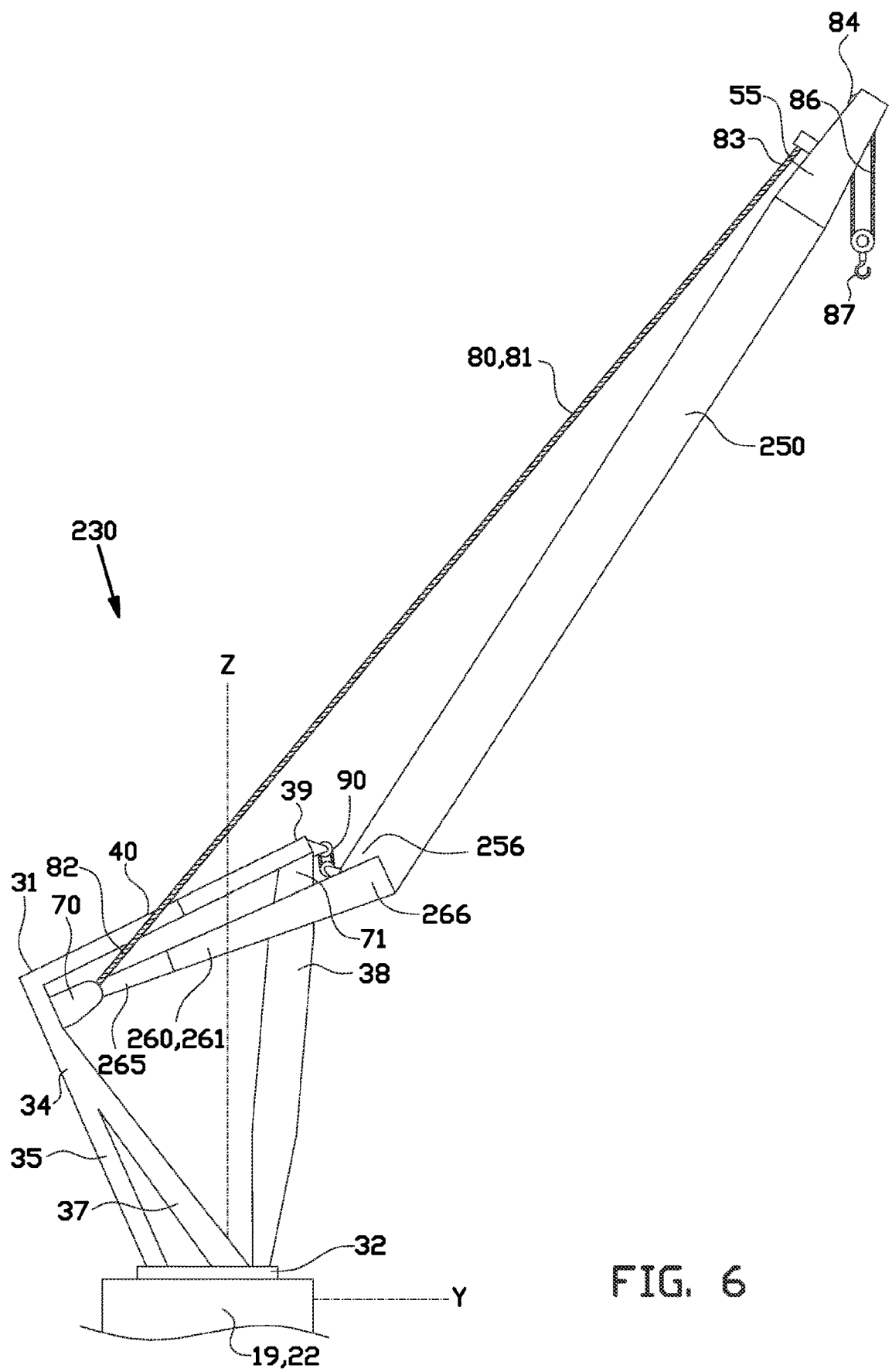
FIG. 6 a side view of the crane according to FIGS. 5A and 5B, in its operational raised position.

FIGS. 5A, 5B and 6 show a crane 230 according to a second embodiment of the invention on the jack-up house 19 of the jack-up crane vessel 10. The components of this crane 230 that correspond with the crane 30 according to the first embodiment are provided with the same reference numbers. Only the deviating components are discussed hereafter and are provided with reference numbers added with 200.

The crane 230 comprises a single, straight, elongated boom 250 that extends in the projection parallel to the vertical axis Z in the direction of the horizontal axis Y. The boom 250 has the boom tip 55 at its distal end and a boom heel 256 at the bottom of the proximal end. In this example the boom 250 is a latticed boom 250. The lattice construction can be made from steel tubes. Alternatively the boom 250 is a single column, made of steel or carbon fiber.

The crane comprises a steel boom spacer 260 that extends between the boom heel 256 and the crane base 31. The boom spacer 260 comprises two spacers 261 that are at a first end 265 rotatable connected with the first suspension 70 for rotation in direction D around the horizontal rotation axis. The spacers 261 converge from the first suspension 70 to the boom heel 256 where they are rigidly connected with at their second end 266. In this example the spacers 261 are rigidly connected with the boom heel 256, under a fixed angle C of about 110-145 degrees. The boom heel 256 and the spacers 261 may alternatively be connected with each other by means of hinges with a horizontal rotation axis that extends parallel to the rotation axis X at the first suspension 70. Under the fixed angle C, the boom heel 256 extends in the operational, raised position as shown in FIG. 6 even above the first suspension 70 in the vertical direction parallel to the rotation axis Z. In this embodiment the boom heel 256 does not pass the upward front box girder 38. The boom heel 256 extends in both the lowered transport position and in the raised operational position in front of the front box girder 38 in the direction of the horizontal axis Y.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In the described embodiments, the boom heel 56, 256 is raised by the boom luffing 90 having the hoisting assembly 91. Alternatively, the boom heel 56, 256 may be lifted by means of a hydraulic equivalent.

The invention claimed is:

1. A Jack-up crane vessel or semi-submersible crane vessel comprising:
   a hull with a deck, and
   a crane on the hull for hoisting a load outside the deck,
   wherein the crane comprises a slewing crane base that is rotatable with respect to the hull around a vertical rotation axis, an elongated boom that is rotatable around a horizontal rotation axis with respect to the crane base, at least two pendants between the boom and the crane base, a boom spacer between the boom and the crane base, and a boom luffing installation for driving the rotation of the boom around the horizontal rotation axis between a lowered transport position and a raised operational position,
   wherein the crane base comprises a slew platform and a base frame above the slew platform that forms a first suspension of the crane base for the boom,
   wherein the boom comprises a distal boom section with a boom tip and a proximal boom section with a boom heel,
   wherein the at least two pendants have a first end that is connected with the first suspension and an opposite second end that is connected with the distal boom section,
   wherein the at least two pendants mutually converge toward the distal boom section,
   wherein the boom spacer has a first end that is rotatable connected with the first suspension for rotation around the horizontal rotation axis, and an opposite second end that is spaced apart from the first end and that is connected with the boom heel to keep the boom spaced apart from the horizontal rotation axis, and
   wherein in the direction of the vertical rotation axis the first suspension extends at least in the lowered transport position of the boom above the boom heel of the boom.

2. The crane vessel according to claim 1, wherein the boom spacer keeps the boom heel spaced apart from the horizontal rotation axis over a fixed distance.

3. The crane vessel according to claim 1, wherein in the direction of the vertical rotation axis the first suspension extends in the raised position of the boom at the same height as the boom heel of the boom.

4. The crane vessel according to claim 1, wherein in the raised position of the boom, the boom heel extends with respect to the first suspension at an opposite side of the vertical rotation axis.

5. The crane vessel according to claim 1, wherein in a projection parallel to the horizontal rotation axis, the horizontal rotation axis extends in a direction transverse to the elongated direction of the boom aside the boom.

6. The crane vessel according to claim 1, wherein the boom spacer has a length between the horizontal rotation axis and the boom heel that is 20-50% of the length of the boom between the boom tip and the boom heel.

7. The crane vessel according to claim 1, wherein the boom spacer is connected under an angle with the proximal boom section.

8. The crane vessel according to claim 7, wherein the angle is a fixed angle.

9. The crane vessel according to claim 7, wherein the angle is 90-145 degrees.

10. The crane vessel according to claim 1, wherein the at least two pendants have the same fixed length between the first end and the second end in the lowered transport position and in the raised operational position of the boom.

11. The crane vessel according to claim 1, wherein the at least two pendants comprise a cable or rope between the first end and the second end.

12. The crane vessel according to claim 11, wherein the rope or cable is based on a synthetic fiber.

13. The crane vessel according to claim 1, wherein the first ends of the at least two pendants are rotatable connected with the first suspension.

14. The crane vessel according to claim 1, wherein the first ends of the at least two pendants are connected with the first suspension at a mutual distance in the direction of the horizontal rotation axis that is larger than the largest width of the distal boom section in that direction.

15. The crane vessel according to claim 1, wherein the first ends of the at least two pendants are connected with the first suspension at a mutual distance in the direction of the horizontal rotation axis that is larger than the largest width of the boom in that direction.

16. The crane vessel according to claim 1, wherein the first ends of the at least two pendants are connected with the first suspension at a mutual distance in the direction of the horizontal rotation axis that is larger than the largest width of the slew platform in that direction.

17. The crane vessel according to claim 1, wherein the boom spacer comprises two spacers that extend spaced apart from each other to define a passage in between,
wherein the vertical rotation axis extends through the passage.

18. The crane vessel according to any claim 1, wherein the boom luffing installation comprises a linear drive between the crane base and the boom heel.

19. The crane vessel according to claim 1, wherein the crane base comprises a second suspension at the opposite side of the first suspension with respect to the vertical rotation axis,
wherein the boom luffing installation comprises a hoisting assembly between the second suspension and the boom heel.

20. The crane vessel according to claim 1, wherein the base frame comprises two upward box girders having a bottom end that is mounted to the slew platform spaced apart from each other, and two cross box girders having a bottom end that is mounted to the slew platform spaced apart from each other,
wherein the upward box girders and the cross box girders are connected with each other at their opposite upper end in pairs to form two triangular frame configurations or A-frame configurations on opposite sides of the vertical rotation axis,
wherein the first suspension is located at the top of the triangular frame configurations or A-frame configurations.

* * * * *